US008470170B2

(12) United States Patent
Harris

(10) Patent No.: US 8,470,170 B2
(45) Date of Patent: Jun. 25, 2013

(54) OZONE-ASSISTED FLUID TREATMENT SYSTEM FOR A RESERVOIR

(76) Inventor: Charles E. C. Harris, Chiang Rai (TH)

( * ) Notice: Subject to any disclaimer, the term of this patent is extended or adjusted under 35 U.S.C. 154(b) by 428 days.

(21) Appl. No.: 12/686,315

(22) Filed: Jan. 12, 2010

(65) Prior Publication Data

US 2010/0200517 A1 Aug. 12, 2010

Related U.S. Application Data

(60) Provisional application No. 61/144,093, filed on Jan. 12, 2009.

(51) Int. Cl.
*C02F 1/78* (2006.01)
*B01D 35/00* (2006.01)
(52) U.S. Cl.
USPC .................. 210/167.12; 210/167.3; 210/205; 210/218; 210/220
(58) Field of Classification Search
USPC ......... 210/615–619, 760, 764, 167.1, 167.11, 210/167.12, 167.13, 167.3, 192, 205, 218, 210/220, 242.2
See application file for complete search history.

(56) References Cited

U.S. PATENT DOCUMENTS

| 3,692,180 | A | * | 9/1972 | LaRaus ......................... 210/192 |
| 5,037,550 | A | * | 8/1991 | Montagnon et al. .......... 210/602 |
| 5,071,550 | A | * | 12/1991 | Bernhardt ................... 210/242.2 |
| 5,641,399 | A | * | 6/1997 | Rawlins .................... 210/167.12 |
| 5,695,635 | A | * | 12/1997 | Sasaki et al. ................... 210/760 |

* cited by examiner

*Primary Examiner* — Lucas Stelling
(74) *Attorney, Agent, or Firm* — Donald L. Bartels; Bartels Law Group

(57) ABSTRACT

The invention is an apparatus and method for treating fluid in a pool, spa, or water tank, etc., using ozone and treated air. A fluid filter is placed in an auxiliary reservoir or a smaller fluid tank located in or next to the pool, spa, or main water tank. An ozone generator pumps a combination of ozone and air into the smaller fluid tank. Fluid in the smaller fluid tank passes through a filter and back into the main reservoir without the use of any fluid pump. More specifically, a vertical lift tube is placed beneath the smaller fluid tank so that the open top of the lift tube is within the smaller fluid tank. Fluid from the main reservoir is piped to the bottom of the lift tube. Ozone and air from the ozone generator is also piped into the lift tube near its bottom. The fluid flows through the filter due to the effect of ozone and air bubbles released by a diffuser at the bottom of the lift tube. The diffuser releases thousands of tiny bubbles into the lift tube, which cause the fluid in the tube to rise and mix with fluid already in the smaller fluid tank. This rising fluid also causes fluid to flow through the filter. The ozone treated fluid output from the filter is piped back into the main storage tank/pool.

12 Claims, 14 Drawing Sheets

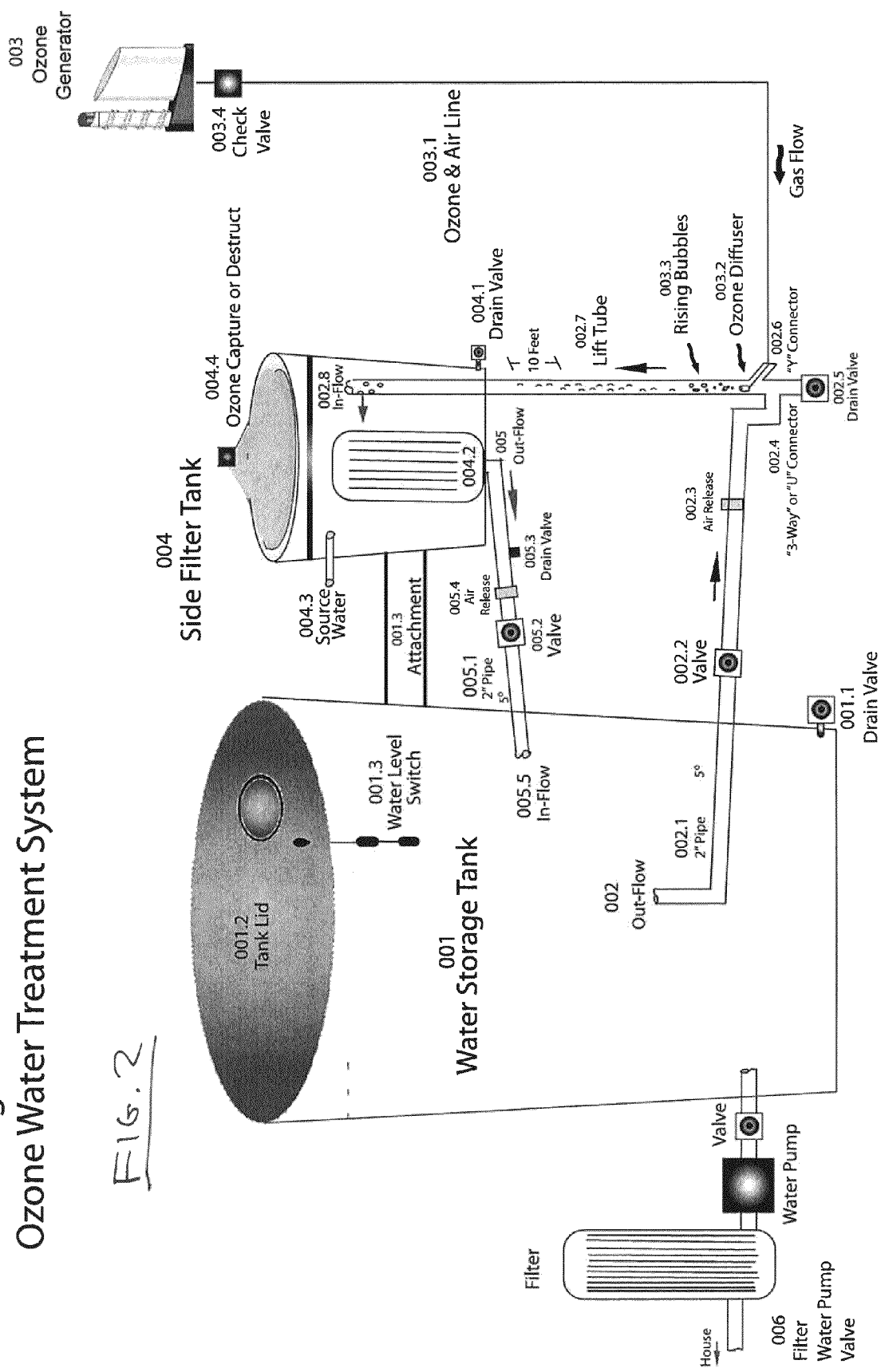
FIG. 2 — Water Storage Tank With Side Filter Tank Ozone Water Treatment System

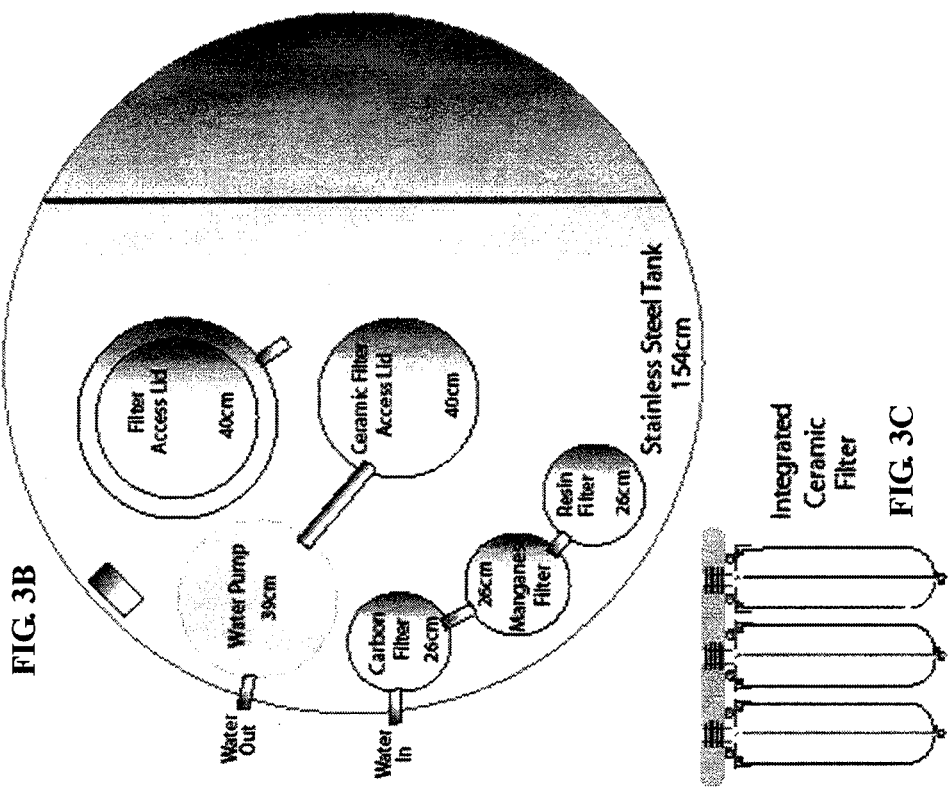

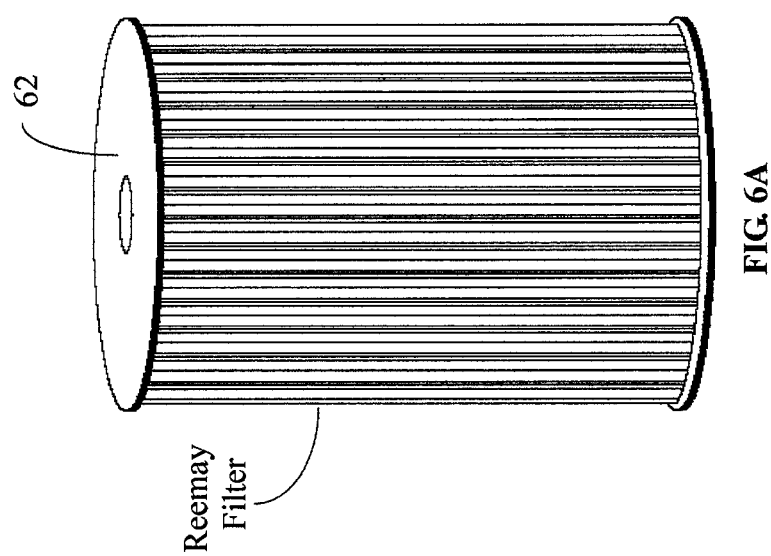

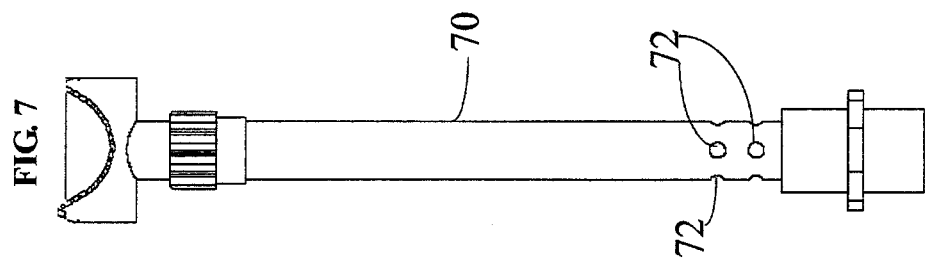

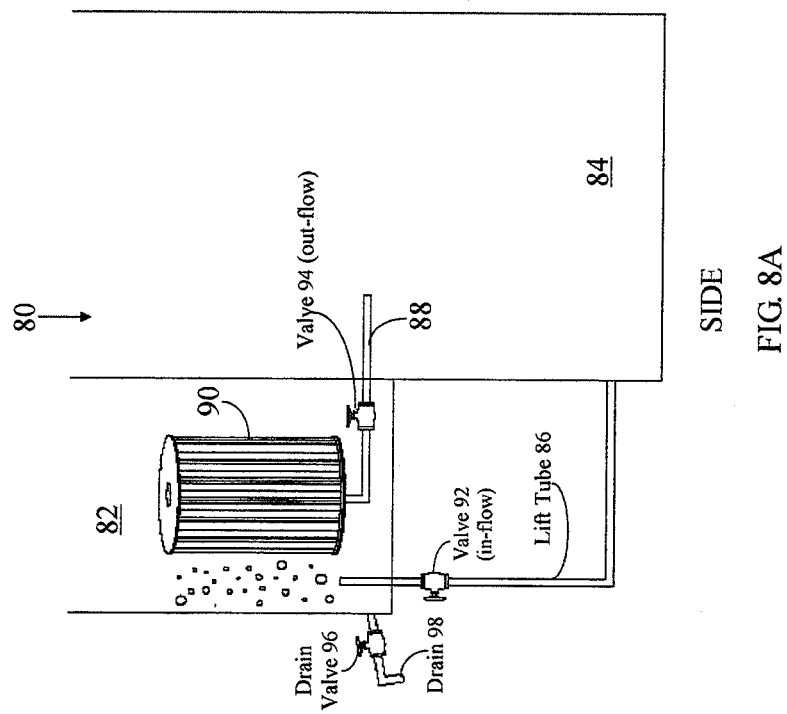

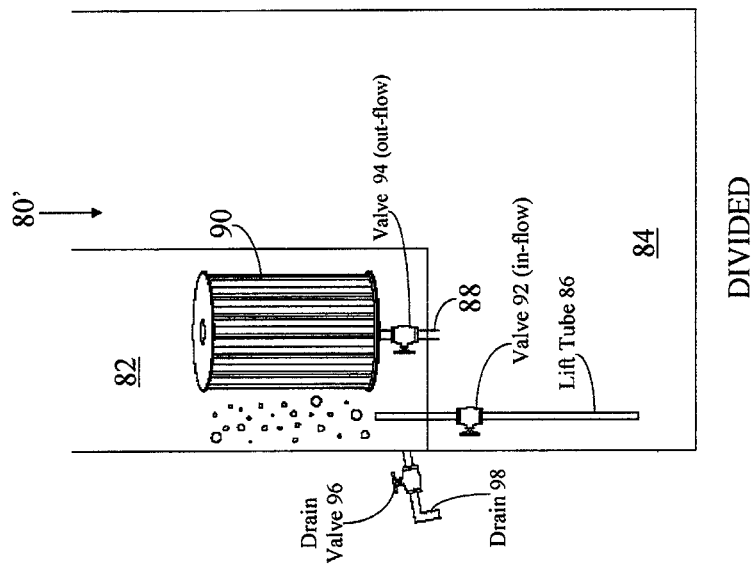

OZONE-ASSISTED FLUID TREATMENT SYSTEM FOR A RESERVOIR

PRIORITY

The present application claims priority to U.S. Provisional Patent Application Ser. No. 61/144,093, filed Jan. 12, 2009, entitled Ozone-Assisted Fluid Treatment system for a Reservoir, the entirety of which is hereby incorporated herein by reference.

FIELD OF THE INVENTION

This invention relates in general to a fluid treatment apparatus, and more specifically to an apparatus that releases a mixture of ozone and air to treat fluid that goes into a fluid reservoir.

BACKGROUND

Ozone ($O_3$) is a gas with strong oxidation properties that has been used for domestic water treatment in Europe since the early 1900's. Ozone is produced by high-intensity ultraviolet (UV) light or by a high-voltage electric field. The normal byproduct of ozone is oxygen ($O_2$). Ozone is created when either UV or a corona discharge (CD) is applied to oxygen. The oxygen disassociates into single oxygen atoms which recombine into ozone. Ozone has a half life of about 2 to 12 hours in air and about 20 minutes when dissolved in water. Ozone is 13 times more soluble in water than oxygen. Ozone oxidizes and disinfects and deodorizes. Ozone also micro-flocculates iron and manganese and kills bacteria 3,000 times faster than chlorine, kills viruses, algae spores, and some parasites, precipitates heavy metals, controls formation of scales, and oxidizes oils. Ozone also has a fresh smell like that of an electrical storm.

Typical ozone application into water to be treated has been provided by simply bubbling ozone and air into a tank of water with the use of a diffuser (known as an ozone aeration system) or by a venturi eductor used in conjunction with a water pump. Passing water through a venturi eductor creates a suction which draws in ozone and mixes the ozone gas with water. The ozone gas is introduced into a contact tank where undissolved ozone gas is vented or is introduced directly into a storage tank and bubbles up through the tank and out the top of the tank. This same type of system has been used in swimming pools and spas, introducing the ozone into the pool or spa. In some cases, spa applications have used existing "spa hydrotherapy jets" as the means to "suck in" the ozone gas and mix the gas with the spa water.

Ozone water treatment systems have been in use for over 100 years in many applications including the pool and spa industry as well as treating water in water storage tanks. Ozone is used in combination with various chemicals in the pool and spa industry. Ozone is used to treat iron, manganese, and hydrogen sulfide in well water and to kill pathogens in surface waters such as lakes and streams. Ozone systems come in many varieties and ozone is produced in many ways.

Systems for water storage tanks are designed to clean "raw" water, whereas systems for pools and spas are designed to keep treated water clean as it is used over and over again. Prior art systems focus on using ozone and a filter to treat a reservoir of water. One prior art system adds a "mixer" assembly and a lift tube to mix ozone and new water coming into the reservoir. Such a prior art system is disclosed in U.S. Pat. No. 5,190,648 to Ramsauer, issued Mar. 2, 1993.

The Ramsauer system discloses a lift tube positioned in a single tank or reservoir. Air containing ozone generated by the ozone generator is injected into the bottom of the lift tube using a diffuser, which causes the ozonated air to be converted to bubbles. The ozonated air bubbles up through the water in the lift tube and into the tank and can escape through the top of the tank. As taught in Ramsauer, the lift tube is part of an in-the-tank filter module. The ozone gas mixing and filtration and circulation are accomplished within the filter module assembly. The action of the bubbles rising and expanding in the lift tube causes a current flow, which causes the water to be first drawn through the filter where the water is filtered with each pass and thereby prefiltering the water prior to its contact with the ozonated air. This increases the ability of the ozone to do its job.

The single reservoir design known in the art is simple to install and requires no cutting into the wall of the pool, spa, or tank to install separate lines. However, the "single" reservoir system is more difficult to maintain, because the filter needs to be pulled from the reservoir for cleaning and maintenance. In addition, the Ramsauer system does not treat the capturing ozone emanating from the reservoir after treatment, for destruction or to channel it elsewhere for some other use. There is no mechanism for preventing the user from being exposed (when used in pools and spas) to the damaging effects of ozone on an individual's mucus membranes.

SUMMARY OF THE INVENTION

The present invention solves the limitations of prior art fluid treatment systems by using an auxiliary chamber for treating fluid before sending the treated fluid to a main fluid reservoir. The auxiliary fluid reservoir is alternatively referred to as a "side filter" or a "Sifil" reservoir or tank, although the auxiliary fluid reservoir may be located inside or outside the main reservoir. After fluid treatment, the ozone gas may be captured and either destroyed or channeled to another spot. The treated fluid is directed to the main reservoir.

In one embodiment, a lift tube lifts fluid from a main reservoir into the auxiliary reservoir positioned to the side of the main reservoir. The flow of fluid increases the height of the fluid level in the second reservoir above the fluid level of the first reservoir and this difference in fluid level creates a gravity flow from the second reservoir back to the first reservoir and allows for the fluid to be filtered by means of a filter placed in the second reservoir through which the fluid passes in order to flow back to the first reservoir. This circular flow allows the filter to trap impurities in the fluid.

The side filter tank (Sifil System) enables the easy cleaning of the filter in a manner such that the impurities captured by the filter are kept out of the main fluid reservoir. The auxiliary fluid reservoir also enables a conduit to feed fluid from an external source to the auxiliary fluid reservoir. This gives the filter an initial opportunity to remove impurities before the new fluid flows to the main reservoir. It may be possible to even clean the filter while it is still in the side filter tank, by washing it and letting the particulates drain out the bottom. Moreover, for pools and spas, the side filter tank allows an ozone generator and its ozone and treated air it produces and bubbles into the side filter tank to operate 24 hours a day at a comfortable distance and away from the users who would otherwise be irritated by the ozone.

In another embodiment, referred to as a divided tank filter system, source fluid is ozonated and filtered in an auxiliary chamber (divided tank) which is located inside the main reservoir, but is isolated from the main reservoir.

Broadly stated, the present invention is an apparatus for supplying ozone-aerated and filtered fluid to a main fluid reservoir, comprising: an auxiliary fluid reservoir for filtering and ozone-aerating fluid therein; a first conduit for enabling ozone-aerated and filtered fluid in the auxiliary reservoir to flow into the main reservoir; a second fluid conduit for enabling fluid to flow from the main fluid reservoir to the auxiliary fluid reservoir; a filtration device comprising filtering surfaces housed within the auxiliary fluid reservoir, wherein fluid in the auxiliary fluid reservoir is enabled to pass peripherally through the filtering surfaces; and a diffuser for injecting ozonated air into the fluid in the auxiliary fluid reservoir; wherein the auxiliary fluid reservoir and first and second fluid conduits are positioned with respect to the main fluid reservoir to cause fluid in the auxiliary generator to be fed by gravity into the main fluid reservoir when the fluid level in the auxiliary fluid reservoir is higher than the fluid level in the main fluid reservoir; and wherein the diffuser is positioned in the auxiliary fluid reservoir to cause fluid to be drawn into the auxiliary fluid reservoir from the main fluid reservoir via said second conduit and to flow up into the auxiliary fluid reservoir and be in contact with the ozonated air being injected by the diffuser, to pass peripherally through the filtering surfaces, and to cause the level of fluid in the auxiliary fluid reservoir to be higher than the level of fluid in the main fluid reservoir as a result, to thereby cause ozone-aerated fluid to flow into the first fluid conduit from the auxiliary fluid reservoir and back into the main fluid reservoir.

The present invention also comprises a method for supplying ozone-aerated and filtered fluid to a main fluid reservoir, comprising: providing an auxiliary fluid reservoir coupled to the main fluid reservoir; providing a filtration device comprising filtering surfaces within the auxiliary fluid reservoir, wherein fluid entering peripherally into the filtration device passes through the filtering surfaces; releasing ozonated air into the auxiliary fluid reservoir through a diffuser positioned in a lift tube to cause an upward flow of ozone-aerated fluid within the auxiliary fluid reservoir, which causes fluid to be drawn into the auxiliary fluid reservoir from the main fluid reservoir, resulting in the fluid level in the auxiliary fluid reservoir being higher than the fluid level of the main fluid reservoir; and returning the ozone-aerated fluid by gravity from the auxiliary reservoir to the main reservoir.

In another embodiment, the present invention is an apparatus, comprising: a main fluid reservoir; an ozone generator that generates ozonated air; an auxiliary fluid reservoir; first and second conduits for recirculating fluid between the fluid reservoir and the auxiliary fluid reservoir; a lift tube positioned in the auxiliary fluid reservoir; a diffuser positioned at the bottom of the lift tube; a third conduit for directing the ozonated air to the diffuser; and a filtration device submerged in the auxiliary fluid reservoir, comprising filtering surfaces, wherein fluid entering peripherally into the filtration device passes through the filtering surfaces; and wherein, when the diffuser releases ozonated air into fluid in the auxiliary fluid reservoir, this creates a fluid level in the auxiliary fluid reservoir that is higher than the fluid level of the main fluid reservoir, which causes a flow of ozone-aerated fluid through the filtration device and into the fluid reservoir, such that a continuous flow of fluid is generated from the main fluid reservoir to the auxiliary reservoir through the filtration device and back to the main reservoir.

BRIEF DESCRIPTION OF THE DRAWINGS

Some of the features, advantages, and benefits of the present invention will become more apparent for the following description taken in conjunction with the accompanying drawings, which are presented solely for exemplary purposes and not with the intent to limit the invention thereto, and in which:

FIG. 2 schematically shows an exemplary water storage tank having an ozone water treatment system according to an embodiment of the present invention.

FIG. 3A-C show different aspects of a divided water tank according to another embodiment of the present invention.

FIG. 7 shows an exemplary lift tube.

FIG. 8A-C show different embodiments of auxiliary fluid reservoir assemblies according to embodiments of the present invention.

DETAILED DESCRIPTION OF THE INVENTION

Figure 1:
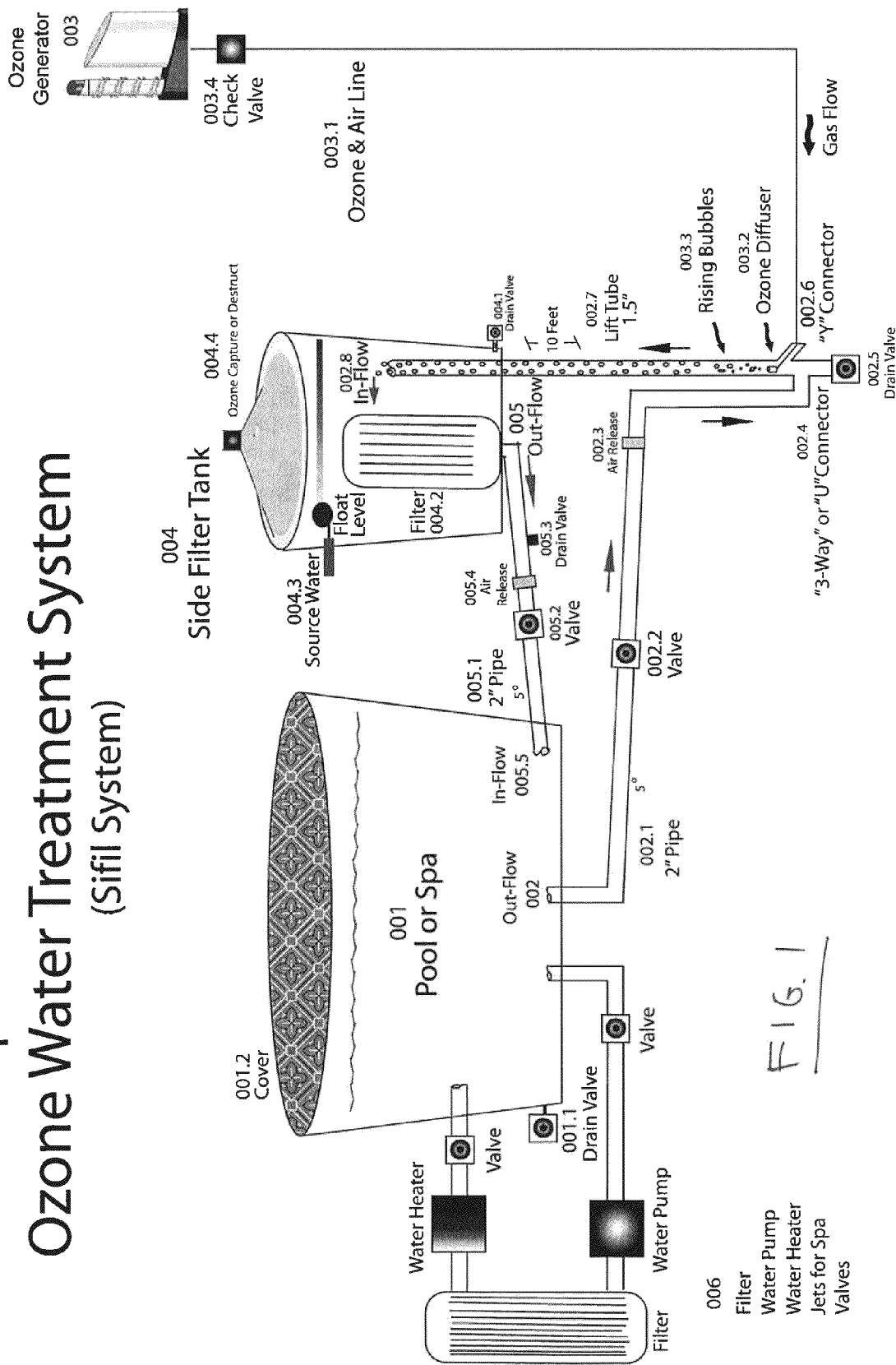
FIG. 1 schematically shows a preferred embodiment of the present invention showing a side filter tank and a fluid circulation system for treating water in an adjoining pool or spa.

There are two basic designs for the ozone fluid treatment systems according to the present invention. One design places a fluid filter in a small fluid tank located inside or next to the pool, spa, or storage tank. A second design places the fluid filter directly in pool, spa, or storage tank. In both designs, the ozone generator pumps a combination of ozone and air into the pool, spa, or storage tank. In both designs, fluid passes through a filter without the use of any fluid pump. The fluid flows past the filter due to the effect of ozone and air bubbles released inside a fluid filter or at the bottom of a lift tube which is either in the pool, spa, or storage tank directly, or placed under and into a separate side fluid tank. As a result, a gentler, more controlled flow of ozonated fluid can be provided to a pool, spa, or storage tank, which can create a more desirable experience for a user of the pool, spa, or storage tank, compared to a system where a fluid pump is used to supply ozonated fluid. The level of ozone in the treated fluid can be controlled by various system parameters, including, but not limited to, ozone generation rate, ratio of air and ozone in the mixture that is released in the fluid by a diffuser, dimensions of an auxiliary reservoir and a main reservoir, the dimensions of the lift tube, if a lift tube is used, etc.

Although water is the preferred fluid to be treated according to the present invention, persons skilled in the art will appreciate that the same system can be used for treating other fluids (the term "fluid" encompasses both liquid and gas and a liquid/gas mixture) without diverting from the scope of the invention. Similarly, the term "reservoir" encompasses spas, pools, storage tanks, treatment/filter tanks, etc. Additionally, the term "ozonated air" or "ozone-treated air" are synonymous, meaning a volume of air and ozone gas mixed together.

Ozone in high concentrations destroys pathogens, spores, algae and various germs and it also oxidizes a number of impurities such as iron, manganese, oils and organic wastes. In the present invention, a high volume of treated air is pumped into the fluid along with a relatively low concentration of ozone. Ozone in low concentrations may not kill all pathogens. However, ozonated fluid in the present invention helps to hinder the growth of many bacteria and reduces pH fluctuations by, for example, obstructing the nitrogen cycle. The relatively gentle fluid flow past the filter also helps to keep the fluid clean too, because many impurities that would normally be pushed through a normal fluid pump and filter combination are trapped by this ozone aeration and filtration system. The advantage of using this type of ozone aeration system is that it renders the fluid in the pool, spa, or tank, rather inhospitable as a growth medium; i.e., bacteria and algae that might otherwise flourish in another environment seem to be greatly reduced because of the lack of nutrients and other conditions needed for growth and reproduction. While a lift tube or side tank may have detectable levels of dissolved ozone in the fluid, it is not certain that the pool, spa, or tank have minimum recommended detectable levels of ozone required for disinfection (0.05 ppm). For example, the EPA recommends that a minimum contact time with ozone be more than 2.9 mg/L-minute at <1 degree Centigrade, decreasing to 0.48 mg/L-minute at 25 degrees Centigrade). In the present invention, ozone, by itself, may not provide complete fluid treatment given the different sizes and configurations of pools, spas, and water storage tanks and the level of treatment and maintenance they are given. However, the low level of ozone concentration may add other benefits to the aeration and filtration system by allowing the filter media itself to form a bio-film composed of protozoa, bacteria, algae, and other living organisms that act as a kind of bio-filter itself with its own "ecosystem" which at the time the water passes through the bio-film, consumes and traps many impurities which would otherwise contaminate the pool, spa, or water tank and create conditions in the pool, spa, or water tank fostering the growth of bacteria, algae, and other impurities as well as chemical conditions which might make the water unusable for humans, for example variations in the nitrogen cycle (making ammonia) and volatile fluctuations in the acid/base pH of the water. A very high level of ozone and the use of chemicals such as chlorine, bromine, or salt (which is used to make chlorine) may hinder the formation of a bio-film on the filter media.

The concept of using a biofilm for water treatment is not new. However, the inventor is not aware of its use for pools and spas. Normally, the idea comes from its use with slow sand filter which form a gelatinous layer called a Schmutzdecke (a grime or filth cover in German coined by the scientist who discovered its significance for water treatment) in the top few millimeters of the sand layer. The Schmutzdecke consists of bacteria, fungi, protozoa, worms, and a range of aquatic life. The Schmutzdecke is the layer that provides the effective treatment in potable water treatment using the sand as the underlying support medium for this biological treatment layer. As water passes through the Schmutzdecke, particles of foreign matter are trapped in the layer and dissolved organic material is adsorbed and metabolized by the bacteria, fungi and protozoa. In the present invention, the filter media, such as, a Reemay media, provides the support for the Schmutzdecke as it adsorbs and metabolizes the dissolved and suspended organic materials in the pools and spas. The formation of a Schmutzdecke on the fluid filter is only made possible by the combination of the gentle 24 hour filtration and ozone/aeration, and the low concentration of ozone and treated purified air that can keep a pool, spa, or water tank exceptionally clean. So clean, that the use of chemicals are greatly reduced or eliminated entirely and in fact, the use of such chemicals as chlorine, bromine, or salt (which is used to make chlorine) may actually destroy the bio-film and/or interfere with the treatment benefits of the present invention. For applications of this system for pools and spas, the additional benefits of covering the pool or spa when not in use, and careful hygiene, along with the ozone, will keep the pool and spa clean.

It should be noted here that in both designs used for the pools and spas, this ozone fluid treatment system is configured to work in tandem with the traditional fluid pump and filter systems that are commonly employed. These traditional pumps and filters are separate from the ozone system and use separate fluid lines (although for the sake of convenience, both systems could share the same outflow and inflow lines for existing structures). The reason to add the ozone fluid treatment system for a pool and spa is that it greatly reduces or entirely eliminates the need for chlorine, chemicals, salts, clarifiers, Ph stabilizers, or other additives that are normally used to keep a pool or spa clean.

Preferred Ozone Generator:

A related patent application Ser. No. 12/634,652, by the same inventor, titled, "Ozone Generator Apparatus and Method for Purification of Air or Liquids," filed Dec. 9, 2009, discloses a unique ozone generator which provides significant improvements to existing pool, spa, and fluid storage tank ozone fluid treatment systems. This application is incorporated herein in its entirety by reference.

For pools and spas, the ozone generator described in application Ser. No. 12/634,652, preferably is the "double UV and double air pump system" which operates continuously 24 hours a day and produces about 6-10 grams of ozone in the same time period. It also produces about 10,000 liters of treated air per 24 hours. Ozone is produced by pumping filtered and heated ambient air past special ozone producing UV lamps housed in a sealed chamber. The treated air is pumped through the ozone lamp housing at the rate of about 7 liters per minute at an average pressure of 3 psi. Ozone makes up less that 1% of the total output (most UV ozone generators produce ozone on the order of 0.1 to 0.01% by weight of air fed to the generator)—the other 99% of the gas stream is treated air which is relatively free of pathogens, germs, algae spores, dust, and other impurities. This mixture of air and ozone gas is pumped to a diffuser which is inside a fluid filter or in some embodiment, a lift tube filled with water connected to a fluid filter. The diffuser releases thousands of tiny bubbles which cause the water to rise and cause a flow of water through a filter. As ozone can be made from many different devices (such as a corona discharge "CD" system), any combination gas comprising ozone and clean treated air delivered at approximately 7 liters per minute at 3 psi in the ratio of about 1% ozone (i.e., similar in output to the UV system described herein) to 99% air with ozone being produced on a continuous basis in 24 hours in a total amount of approximately 6-10 grams can be used in the ozone water treatment systems hereinafter described below. As far as the ozone output on a 24 hour basis for use in pools and spas, the main consideration would be the comfort of the users, as too high an ozone concentration would be irritating to the eyes and skin, and might inhibit the benefits of maintaining a bio-filter on the fluid filter itself. On the other hand, users who did not observe proper hygiene, or who used lavish amounts of sun tan oils, or who required a pool or spa that was quite large or never covered, might need an ozone generator with a higher output than the preferred apparatus mentioned here.

For most smaller pools and for most spas and for most water storage tanks containing approximately 10,000 gallons, the fluid treatment system of the present application works efficiently in conjunction with the ozone generator described in application Ser. No. 12/634,652.

Filter in a Side Tank:

In one embodiment of an ozone fluid treatment system for a pool, spa, or fluid storage tank, the filter is located in a separate tank adjacent to the pool, spa, or fluid storage tank. This type of system is referred to as the "Sifil" (Side filter) system. In one embodiment, an exemplary Sifil system includes a side tank raised above the ground, and a main bigger tank standing on the ground.

One improvement of this system over the prior art is that the untreated/dirty water comes into the small, filter tank first. There the water mixes with the ozone and treated air first and any impurities must pass through the filter first before the water circulates back into the main tank reservoir. As the water is circulated through the filter in the side tank and back to the main reservoir over and over again, any remaining impurities are oxidized, flocculated, and otherwise trapped by the filter in the side tank. As the water is consumed from the main tank, untreated new water is refilled directly to the side tank.

Note that the water used in this system is preferably not heavily contaminated well water. Such a water source may be contaminated with iron and manganese which comes up looking very cloudy and has an iron smell. Many wells are contaminated with iron, manganese, and hydrogen sulfide and this system may therefore also be used to effectively treat these impurities. The filter catches any iron or manganese that the ozone and air have oxidized and microflocculated. For a water storage tank which keeps well water which is very high in iron and manganese, one needs to match the ozone demand with the given impurity. When there is a large amount of iron, manganese, hydrogen sulfide (rotten egg smell) in the water, a very high dose of ozone may be required. Blasting that water with a huge amount of ozone (by a bigger UV ozone lamp or a CD unit) would be the goal—to oxidize all the iron, etc. However, there is no bio-filter that would form for this type of well water. First, the iron would bury and destroy any Schmutzdecke layer or prevent a Schmutzdecke from forming in the first place. Second, the amount of ozone required might destroy any life in the Sifer tank.

For pools, spas, and "surface" waters stored in a water storage tank, as contemplated for the treatment system according to a preferred embodiment of the present invention, a low amount of ozone and clean air (both adjusted for actual conditions) is good for the creation of a bio-filter which lives on the filtering surfaces. This bio-filter acts to further filter and clean the water.

A preferred embodiment of an ozone fluid treatment system is shown in FIG. 1. In this embodiment, specific dimensions of different elements have been disclosed for exemplary purposes only. The invention is not limited to the specific dimensions discussed.

In the system shown in FIG. 1, fluid from a pool or spa 001 flows through an outlet and into a 2 inch pipe 002 at the bottom (or near the bottom) of the pool or spa. The fluid flows down preferably through the 2 inch pipe 002.1 with a slope of at least 5 degrees downwards to allow trapped air to rise to the surface of the pool or spa. The pipe has an on-off fluid flow control valve 002.2 and an air release valve 002.3. The fluid in the pipe goes down preferably at least several feet and the fluid then is directed upwards by either a 3-way connector pipe or U pipe connector 002.4. Afterwards, the fluid comes in contact with ozone gas and air from the ozone generator 003 which pumps pressurized ozone and air into an ozone line 003.1 that connects through a "Y" connector 002.6 to an ozone diffuser 003.2 mounted at least 3 inches above the connector or U pipe at 002.4. Attached to the bottom of the connector 002.4 is a fluid drain valve 002.5 for maintenance.

The diffuser 003.2 releases the ozone into the fluid by means of small bubbles of ozone gas and air 003.3 inside a lift tube 002.7 which can be reduced in diameter to 1.5 inches. The lift tube 002.7 preferably points straight up to prevent the bubbles from coalescing. The ozone generator 003 is preferably mounted on a wall at least 5 feet away and within 15 feet of the pool or spa 001. The ozone and air line 003.1 has a check valve 003.4 and it should be mounted preferably at least 10 inches above the fluid levels of either the pool or spa 001 or the side tank 004 to prevent fluid from going into the ozone generator as the result of a power failure or some other problem. The rising bubbles 003.3 from the air/ozone mixture pull the fluid upwards inside the lift tube 002.7 which is preferably at least 10 feet long. The longer the lift tube the better, as it provides more contact time to allow the ozone to both dissolve in the fluid and produce more lift of the fluid and a higher fluid flow rate. The lift tube is preferably about 1.5 to 2 inches in diameter. The lift tube 002.7 lifts the fluid into a fluid tank 004 at the in-flow level 002.8.

The side filter tank 004 should be located adjacent to the pool or spa 001 preferably about 3 feet away to provide some distance between the pool or spa and the area where the ozone dissipates in the air. The tank 004 may be fitted with a screen or semi-sealed top 004.4 to prevent insects, birds, leaves, dust, etc. from falling into the fluid and/or to capture the ozone for later use or conversion back to simple oxygen. The tank 004 should be preferably sized to hold about 30 to 50 gallons and be at a level so that the upper rim of the tank is preferably about 12 inches above the fluid level of the pool or spa tank 001. The bottom of the tank 004 is preferably about 20 inches below the fluid level of the pool or spa. When the pool or spa 001 is empty, all the fluid from the tank 004 should be able to easily drain back to the pool or spa 001. The lift tube 002.7 lifts the fluid into the fluid tank 004 at such a level as to be no more than preferably the fluid level of the pool or spa 001. A higher entry point might still be used in certain situations, but the flow rate of the fluid in the lift tube would decrease until at some point as the lift tube is raised higher and higher above the fluid level of the pool or spa, the lift from the rising bubbles would not be great enough to pull the fluid up and out of the pipe at the in-flow level 002.8.

The fluid with dissolved ozone and air is emptied into the tank 004 and flows past a filter 004.2. The filter is preferably a continuous filament spun-bonded polyester called Reemay® because of its high efficiency and large surface area; however, other conventional filters such as spun polyester fibers or polypropylene fibers, sand, or DE may be used. The fluid flows back to the pool or spa 001 through the out-flow 005 and a 2 inch pipe 005.1 positioned to have a downward slope preferably of at least 5 degrees (to let trapped air escape and for easy maintenance). The pipe 005.1 is also fitted with an on-off fluid flow control valve 005.2 and fluid drain valve 005.3 and an air release valve 005.4 connects back to the pool or spa at the in-flow 005.5. The location of the out-flow 002 and in-flow 005.5 can be adjusted (i.e., as far apart as practical) so that there is maximum water flow and circulation of the entire contents of the pool and spa. Finally, to complement the ozone system, other conventional accessories such as fluid pumps, filters, fluid heaters, jets, and other equipment, collectively 006, may be employed. These accessories 006 are all on a separate fluid line and are used in a traditional manner. In some circumstances, it may be preferable for the ozone system and the accessories 006 to share the same out-flow and in-flow holes in the pool or spa. This can be achieved with additional valves and tanks which would seek to emulate two separate lines with very different pressures involved. It may be preferable to operate the traditional fluid pump and filter system for longer periods than usual to prevent bacteria and algae growth in the fluid or filter system during periods of non-operation. The ozone system operates 24 hours a day and is used as an additional filtration system so that chemicals, salts, or other additives can be greatly reduced or even eliminated.

The pool, spa, or storage tank 001 can be made of any shape and out of any number of traditional materials. However, the size of the pool, spa, or storage tank relates to the capacity of the ozone generator. Using an ozone generator having an ozone generating capacity as above described, a pool will typically need one generator for approximately every 25,000 gallons of fluid. For a spa which is kept at higher temperatures, one generator would be appropriate for every 1200 gallons of fluid. Moreover, for pools and spas, the type of accessories, the fluid pump and filter systems used, the type of maintenance, and personal hygiene of the users would vary the amount of fluid that the ozone unit can keep clean. In addition, the pools and spas are preferably indoors or covered at all times with a cover 001.2 when not in use, to reduce flying debris and impurities from being blown into the pool or spa.

The ozone generator preferably operates 24 hours a day. The ozone generator as described in application Ser. No. 12/634,652 typically uses about 100 Watts of electricity. Germs and spores are greatly reduced or even eliminated using the system disclosed in FIG. 1 without the use of any chemicals. Solids wastes, skin, hair and other impurities are continuously filtered from the fluid without use of additives or chemicals. The nitrogen cycle (nitrates, nitrites, and ammonia) seems to be disrupted and renders the fluid relatively pH stable. Algae growth in the pool or spa seems to be greatly reduced, requiring less cleaning cycles. The ozone produced by the UV lamps is so small that ozone can be injected into the fluid 24 hours a day without irritating the users or inhibiting any possible bio-film that may add to the treatment of the water. This continuous filtration and use of a small amount of ozone inhibits bacteria and algae growth in the pool or spa. Harmful levels of ozone gas do not irritate the skin, eyes, throat, nose, lungs or bronchial tubes because the ozone gas is located in a separate tank several feet away.

The excess ozone that does not dissolve in the fluid can be collected 004.4 with a semi-sealed cap above the tank 004 and either piped to another location or destroyed and changed back to oxygen by the use of activated carbon in a small outlet at the top or in some other way known in the art.

The tank 004 can also be used as a convenient method for adding fluid and keeping the level of the pool or spa at a constant level. Tank 004 can be fitted with a float valve or pressure switch 004.3 to keep the fluid level in pool or spa 001 at a constant level. On the other hand, depending on the source fluid, the float valve or level switch may be fitted to the pool or spa 001 but the inflow of fluid comes into tank 004. This may be preferable when the source fluid is full of impurities which would dramatically clog the tank filter 004.2 and increase the fluid level in tank 004 (while the fluid level in the pool or spa 001 is still at a low level) because the flow rate of the fluid through the filter decreases to the point where in extreme cases, tank 004 would overflow—a good indication of a time to clean the filter. The filter can be cleaned and reused by simply taking it off its mounted threads, or if conditions permit, keeping the filter attached, and cleaning it with a spray of fluid from a garden hose. The side tank 004 can also be drained 004.1 to remove any impurities that have settled to the bottom of the tank.

Another benefit using the fluid treatment system according to the present invention is that new fluid entering the side tank 004 would mix with fluid that has the highest concentration of ozone and air, giving some contact time to oxidize impurities and kill germs and algae. This fluid would be filtered before it flows back to the pool or spa 001, and filtered again and again as the water circulates back up the lift tube and back into the side filter tank. Each subsequent cycle of the circulating water is another opportunity for the filter to catch more impurities. Moreover, the filter in tank 004 also may act as a kind of bio-filter, where some microbial life such as protozoa consuming bacteria (most protozoa and other animals are rarely affected by small amounts of ozone, although in high concentrations, ozone has been shown to kill Giardia, Cryptosporidium, and amebas), bacteria and algae do exist in their own ecosystem and this also acts as a "bio-filter" to reduce impurities in the fluid.

Traditional pool and spa systems use a fluid pump to filter impurities. A fluid pump works at high pressure and high flow rates and many impurities pass right through the filter that may have a pore size of 20 microns (bacteria are about one micron) or larger. On the other hand, the ozone fluid treatment system described herein allows for a gentler low pressure filtration and low flow rate, because there is no conventional mechanical fluid pump used to pull or push water through the fluid filter. This low pressure fluid flow enables the filter to trap many impurities down to several microns as the filter media matures and becomes coated with either a bio-film or layers of impurities which also act as additional filter media. The result is cleaner fluid, with less bacterial and algae growth in the pool or spa.

Traditional pools and spas use a variety of chemicals and additives to keep the fluid clean. Ozone is also used, but normally in combination with other chemicals. Also, the ozone generator is usually a higher output system that produces many grams or even kilograms of ozone per day, but the system is not kept on 24 hours a day. Rather, it is turned on and off with the cycle of the fluid pump which operates a venturi that dissolves ozone in the fluid pressure lines. When the venturi and ozone machine are not operating, most pools and spas rely on bromine, chlorine, salt systems (that produces chlorine) or other chemicals to inhibit bacterial and algae growth and keep the water clear and clean. On the other hand, the ozone fluid treatment system according to the present invention preferably dissolves ozone and treated air into the fluid 24 hours a day and provides 24 hour filtration which keeps the water clear and clean and inhibits bacteria and algae growth in the pool or spa in the first place and disrupts the food chain of micro-organisms. The result is clear and clean water with less bacteria and algae in the pool or spa and virtually no need for chemicals.

Storage Tank with Side Filter:

A storage tank with a side filter, as shown in FIG. 2, provides many of the same benefits of the fluid treatment system design for a pool or spa shown in FIG. 1. As shown in FIG. 2, the storage tank 001 would have an outlet 002 to allow fluid to flow into a 2 inch pipe 002.1 which is angled downwards least 5 degrees. The pipe 002.1 would be fitted with an on-off valve 002.2, an air release valve 002.3, and a drain valve 002.5. Fluid would flow downwards several feet to a "3-Way" or "U" connector 002.4 and then be directed upwards where it comes in contact with treated air and ozone from an ozone generator 003 through an ozone and air line 003.1 to an ozone diffuser 003.2 through a "Y" connector 002.6 connected to a lift tube 002.7 about 10 feet long and about 1.5 to 2 inches in diameter which lifts the fluid into a side tank 004 at the in-flow level 002.8. The fluid then flows by gravity past a filter 004.2 past an out-flow 005 and into a 2 inch pipe 005.1 angled down at 5 degrees into the storage tank in-flow 005.5. The pipe 005.1 has an on-off fluid flow valve 005.2, a drain valve 005.3, and an air release valve 005.4. The pipe 002.1, connector 002.4, drain 002.5 and lift tube 002.7 could all be placed inside a larger pipe if it is necessary to dig a hole in the ground and place a part of the pipe and lift tube below ground level (applicable for the pool and spa system, above, too). In that case, the "Y" connector may still be used, or the diffuser could be simply threaded from the top of the lift tube down to about 5 inches about the "3-Way" connector or U pipe 002.4. The level of the ozone diffuser 003.2 must be above the connector 002.4 to prevent the ozone and air bubbles from creating a back-flow to the fluid storage tank and into the Out-Flow at 002.

There are many benefits of this design according to the present invention for a fluid storage tank. First, the source fluid can be directed into the side tank 004.3 and mixed with the ozone and treated air and where it is oxidized and filtered first before the source fluid is added to the fluid in the storage tank 001. Well fluid which is high in iron, manganese, or hydrogen sulfide could be mixed with a higher concentration of ozone and air for a brief period of time and allow an opportunity for oxidation and/or flocculation of these impurities. Oxidation and flocculation changes the form of the iron and manganese to a form that is more easily trapped by the filter. Ozone also removes the smell and taste of hydrogen sulfide by oxidizing the sulfide ion to the sulfate ion (relatively innocuous to humans) and elemental sulfur. Similarly, raw fluid from lakes and streams (called surface fluid) could be directed to the side filter tank first, ozonated, and then filtered before it goes into the storage tank. This would provide an opportunity to reduce or kill bacteria, viruses, and destroy algae and spores and filter organic materials first before going into the fluid storage tank. Such a system would be ideal for a home drinking water system or a drinking water bottle factory which wanted to feature chemical-free drinking water.

The fluid level switch 001.3 can be located in the storage tank 001, but the new fluid can be added to the side tank 004 to avoid artificially high level readings from the side filter tank 004 as the filter becomes clogged with impurities such as oxidized iron or manganese which would inhibit the flow back to the storage tank 001. The side tank could be fitted with a "high" fluid level sensor. In effect, the side tank becomes a mini-treatment ozone and filtration tank and helps keep the storage tank 001 cleaner. Another benefit is that the filter 004.2 would be more accessible and easier to clean. In traditional storage tank systems, the filter must be pulled out by hand through a small access hole on the top of the storage tank 001.2, a dangerous, slippery, and awkward maneuver. Often, impurities trapped in the filter fall off back into the storage tank, making a tank full of dirty particles and debris. The filter is normally cleaned with a fluid spray (from a garden hose) and replaced back into the storage tank. A side tank would make the whole maintenance procedure easier and result in more frequent cleaning cycles and cleaner fluid in the storage tank. The filter 004.2 could be fitted with a removable (threaded or otherwise) mount and the filter could be removed, cleaned, and remounted. If space permitted and one did not have to remove the filter, it could be cleaned while the filter is still mounted in the side filter tank. Impurities that had settled to the bottom of the side filter tank could be removed and drained away by opening a valve on the bottom of the side tank 004.1.

The size of the fluid storage tank, the quantity of fluid used, and the quality of the source fluid together are factors to consider when deciding how much ozone and treated air to use. The more iron and manganese in the fluid, for example, the more ozone and treated air capacity is required. On the other hand, relatively low levels of impurities might allow for an ozone generator producing about half of the previously described generator (a single UV ozone lamp system producing 3 grams of ozone per 24 hours with 3 liters per minute at 4 psi) to be used with success. Sizing charts considering these three factors could be used when deciding how much ozone and treated air to use.

In another embodiment of the side filter tank design (applicable for pools, spas, and water storage tanks alike), the side tank can be a filter housing and placed closer to ground level and connected to the main tank by means of a 2" pipe. The difference is that the filter is placed inside a container that is normally scaled (due to the pressure of the fluid in the main tank), but can be opened to remove the filter for cleaning after on-off valves are moved to the "off" position and insolate the filter housing. The ozone diffuser and "Y" connector and lift tube would be just above the filter housing and direct the fluid back directly to the pool, spa, or tank. The ozone and treated air stream would bubble up, carrying the fluid (and flow through the filter below) back to the main tank. This design may be beneficial to lower the height of the side tank and make the filter more accessible.

For existing pools, spas, and storage tanks, it may be possible to connect in-flow and out-flow lines to the separate filter tank and avoid cutting into the wall or floor of the pool, spa, or tank. One embodiment may use two lines that simply go over the edge of the pool, spa or tank. If the connecting lines are above the water line of the pool, spa, or tank but below the working water level (i.e., the water level when the ozone and air bubbles are lifting the water) of the separate filter tank, the system can be started by a simple siphon effect. To start, one could fill the water in the separate filter tank to its brim with the in-flow and out-flow lines moved to the closed shut-off position. Next, open the shut-off valve for the in-flow line and let the water start to drain back into the pool, spa, or tank until it fills the in-flow line. Next, turn on the ozone generator and allow the bubbles to start pulling the water up into the separate tank. This would have the effect of reversing the water flow from the pool to the separate tank by using a siphon effect. If the water levels are carefully monitored and the generator is started at the right moment, the system should start working and the circular flow of the water from the pool, spa, or tank to the separate tank and back again will run as long as the ozone generator is working properly. Finally, open the out-flow line and allow the water to start circulating normally.

Another method to start the water circulating might employ the use of a "T" connector on the in-flow line, where the top of the T is opened and filled with water to start the siphon effect as the ozone generator is started. One would start to fill the water at the T connector located at the top of the pool, spa, or tank edge after first closing the out-flow line and filling the side tank first.

The value of diffusing large amounts of treated air and creating bubbles to generate fluid flow and circulation through a filter fluid is enormous and helps keep water clean and clear. No matter what the disinfection additive might be (chlorine, bromine, salt, or alum), using a high volume of clean treated air has a tangible beneficial result for a pool or spa. This is in contrast to a normal fluid pump pressure system that forces fluid through a filter at high speed and at high pressures in an attempt to clean the fluid. The fluid pump and fluid filter combination does provide a certain amount of filtration (and even the present preferred ozone treatment system may use the same fluid pump system in tandem in the pool and spa), but the gentle flow of fluid created by the air bubble circulation through the filter cleans the fluid even at a microscopic level (allowing the formation of a bio-film filter on the filter itself) and results in fluid in the main tank, spa, or pool to be cleaner, clearer, and much more of a food barren hostile environment for bacteria and algae that would otherwise flourish without such an aeration/filtration system. This is what is understood to be happening according to the present invention: it is not so much that the ozone is killing all of the bacteria and algae in the pool and spa, as the ozone/treated air filtration combination is rendering the pool and spa fluid rather hostile for bacteria and algae growth. And, it helps that the ozone generator is operating continuously and itself is not pumping millions and millions of spores of bacteria and algae and other contaminants into the pool and spa as it delivers ozone and air to the spa, pool, or water tank reservoir.

Figure 5A:
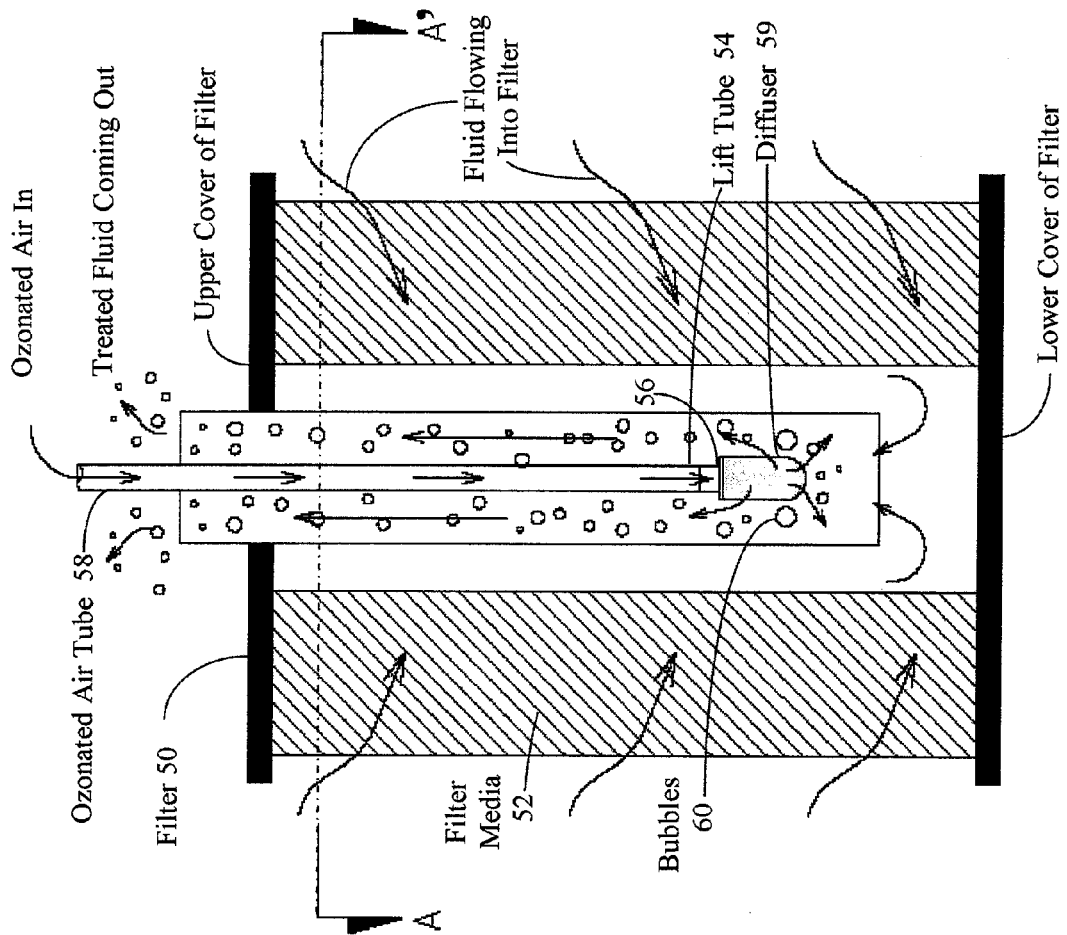
FIG. 5A-B schematically show longitudinal section and cross-section of an exemplary fluid filter according to one embodiment of the present invention.
Figure 5B:
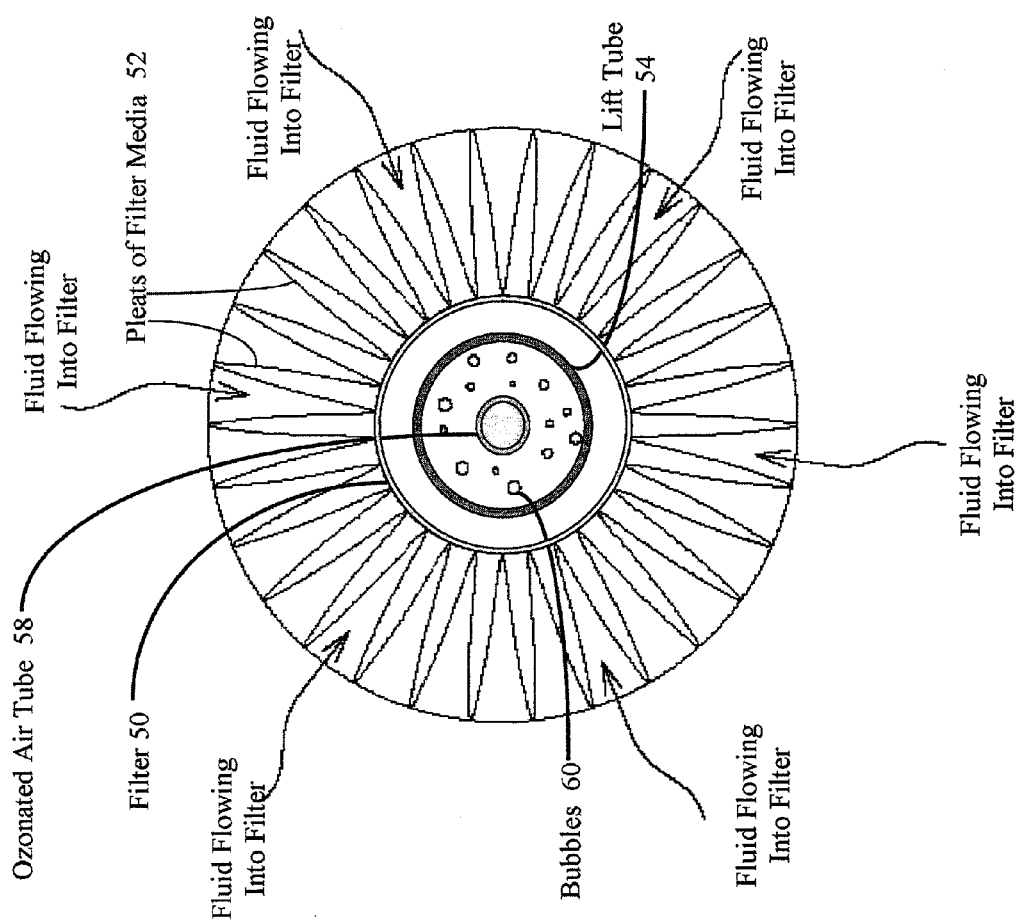
Figure 6B:
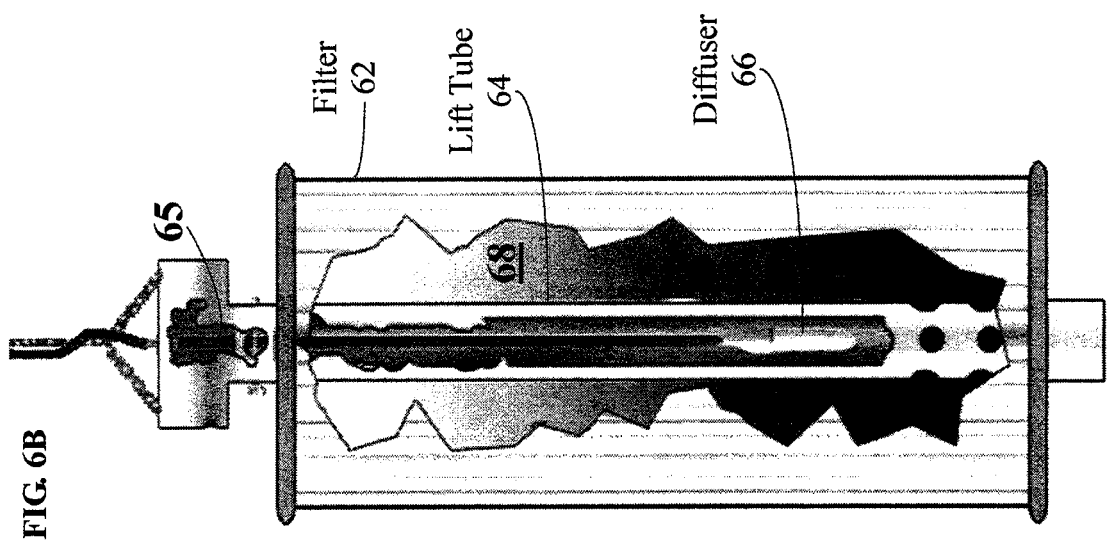
FIG. 6A shows an exemplary pleated filter, according to one embodiment of the present invention, a partially broken away schematic diagram of a diffuser inside a lift tube, reaching within a filter, according to one embodiment of the present invention.

FIG. 5A shows a longitudinal section of a filter 50, showing how ozonated air (path of the ozonated air is shown with dashed lines) is introduced to the diffuser. Fluid enters peripherally into the filter media 52 arranged radially around the central passage of the filter 50 in accordion-like pleats (shown clearly in FIG. 5B, which is the cross sectional view of filter 50 from the top along the plane indicated by AA' in FIG. 5A). At the bottom 56 of lift tube 54, ozonated air from an air tube 58 is mixed with the fluid (fluid flow is shown with heavy solid lines) by means of a diffuser 59. The released ozonated air bubbles (shown schematically at 60, for example) create an upward fluid flow along the inside of the lift tube, and finally, treated fluid comes out from the top of the lift tube. FIG. 6A shows an exemplary conventional Reemay filter 62. FIG. 6B shows a cut-out schematic view of the filter 62, showing the lift tube 64 and the diffuser 66, a conventional diffuser stone, within the lift tube attached to a source of ozonated air via a conduit 65. The lift tube 64 and diffuser 66 are positioned in a hollow central chamber 68 of the filter. Persons skilled in the art will appreciate that the invention is not limited to the arrangement of lift tube, diffuser and filter shown in the example illustrated by FIGS. 5 and 6.

It is to be noted that although in FIG. 5A, a lift tube is shown with an opening at the bottom end, in some embodiments, a lift tube 70 may be designed with holes 72 on the side surface of the lower end of the lift tube, as shown in FIG. 7. The bottom opening of the lift tube 70 can be blocked when the filter is submerged without impeding the lift tube's operation. Only when the filter is being pulled out for maintenance is the bottom of the lift tube 70 opened to enable excess fluid to drain out. The diffuser (not shown) is suspended about 3 inches above the side holes in this embodiment. The rising bubbles inside the lift tube 70 create a suction of fluid into the side holes 72 (after fluid has passed through the filter media). This design with side holes allows the lift tube to be attached mechanically at both ends for a sturdier structure, which can be very useful for longer lift tubes.

Water Storage Tank with Divided Tank Filter System

Figure 3A:
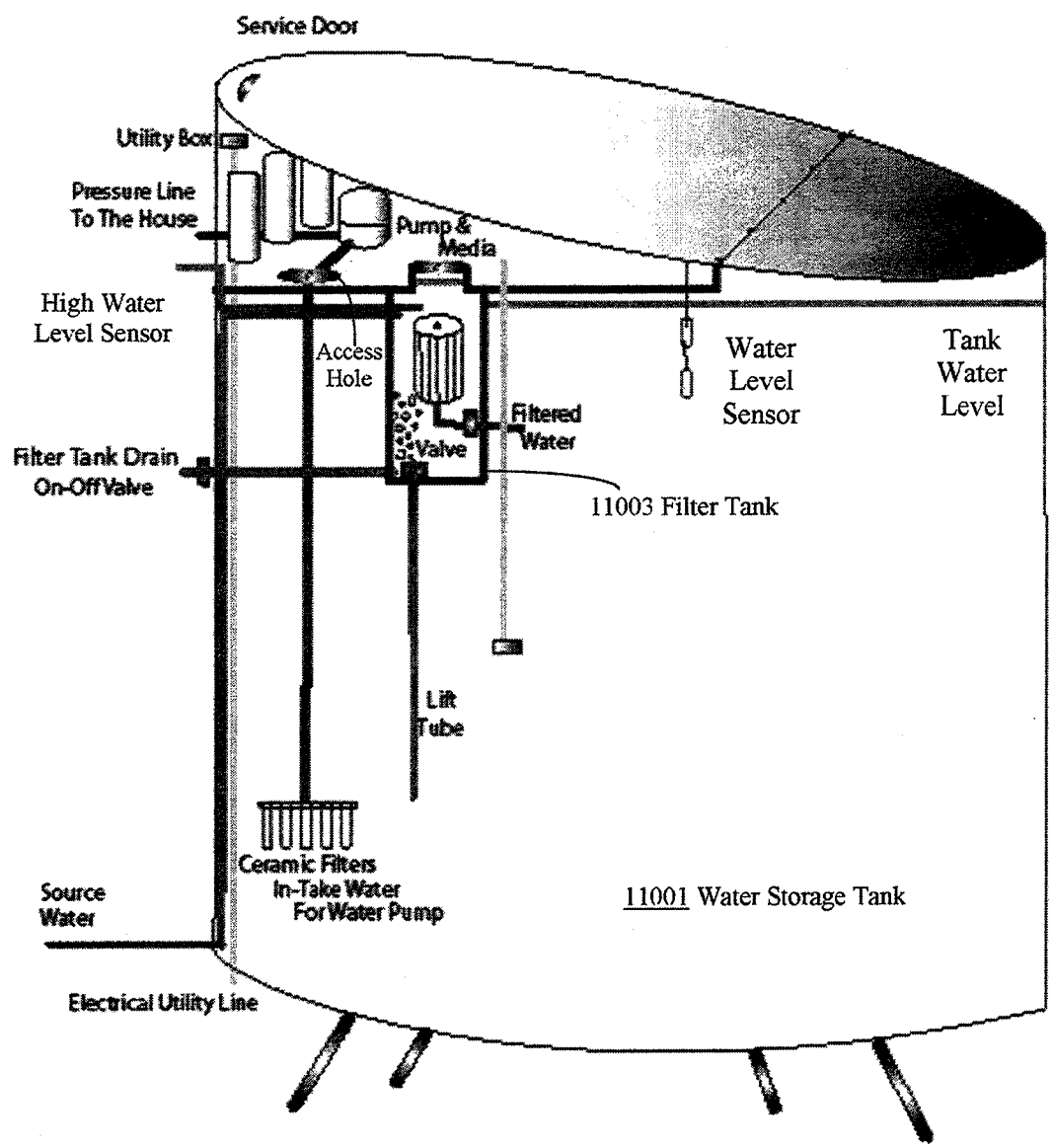
Figure 4A:
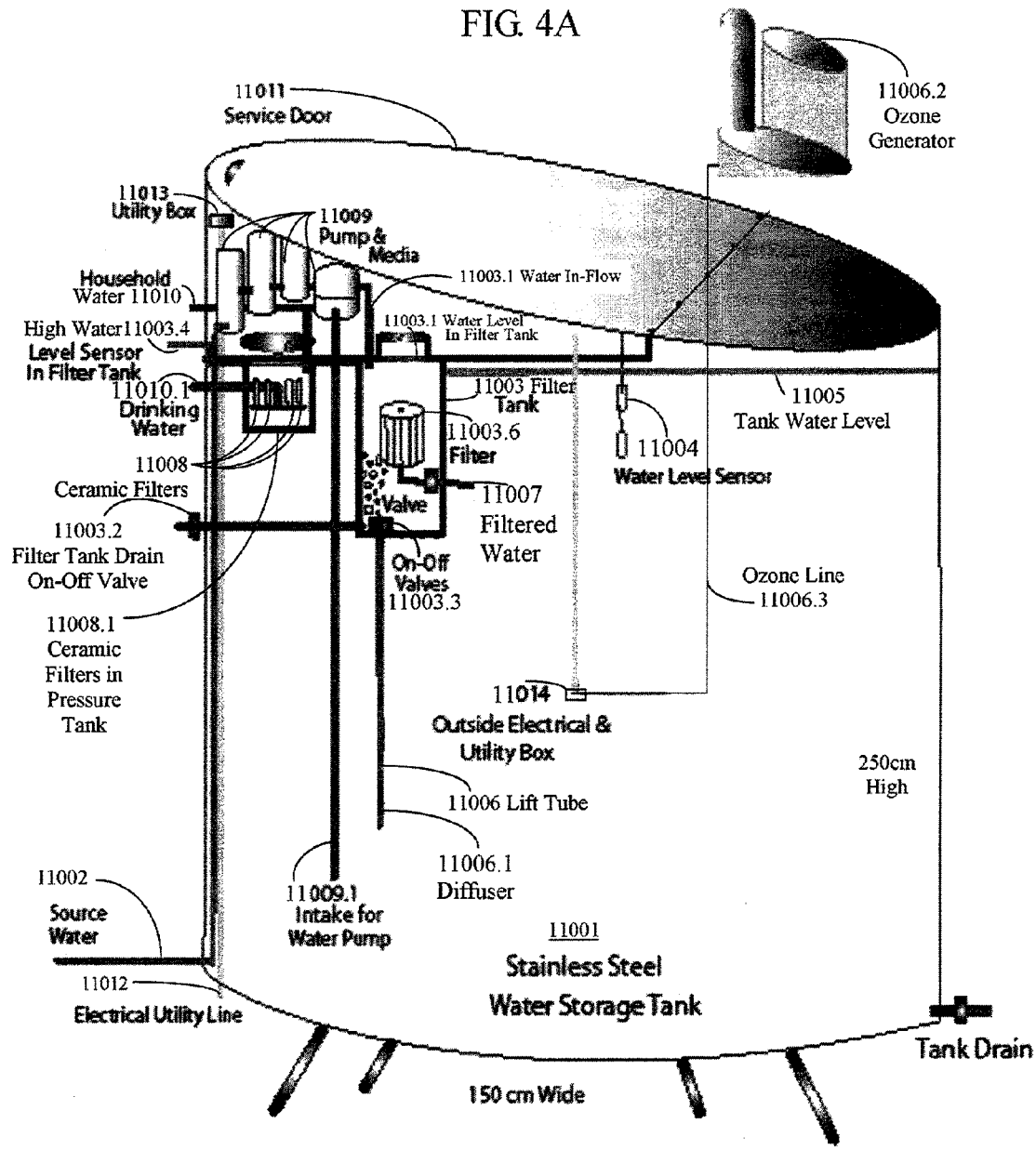
FIG. 4A-C show different aspects of a divided water tank according to another embodiment of the present invention.
Figure 4B:
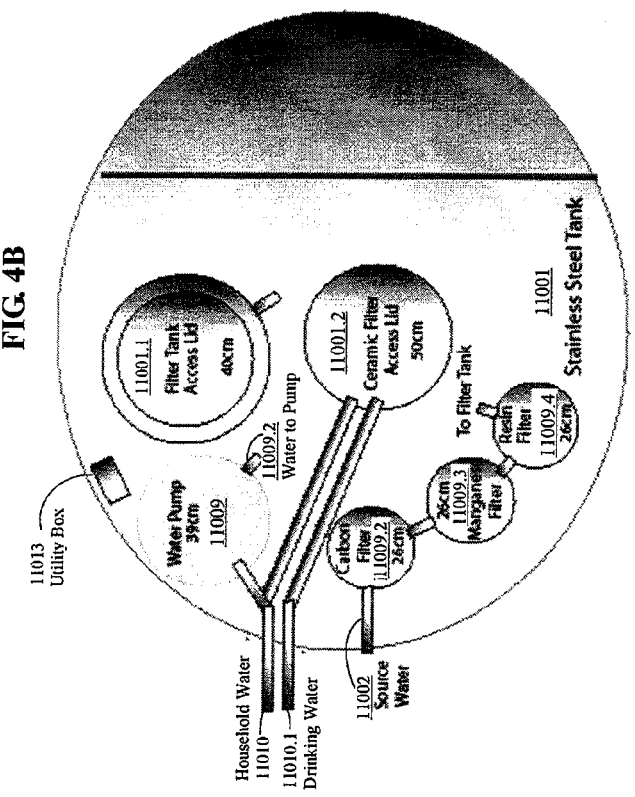
Figure 4C:
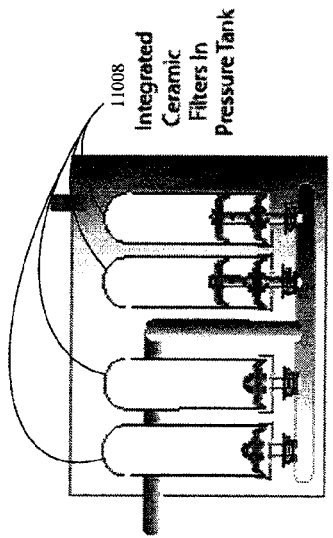

We now discuss exemplary embodiments of the ozone fluid treatment system with the filter within the pool, spa, or fluid storage tank with respect to FIGS. 3 and 4. In all of these exemplary embodiments, source water is first input into a separate auxiliary chamber within the main reservoir, wherein the filter is also housed. This design is called a divided tank filter system. Though specific dimensions and materials are discussed to describe the configurations in FIGS. 3 and 4, persons skilled in the art would appreciate that these illustrative values do not limit the scope of the invention.

As shown in FIGS. 3A, and 4A, the Divided Tank Filter System features a preferably elliptically shaped water storage tank 11001, and a smaller internal separate filter tank 11003, each made of stainless steel.

The system in FIG. 4A also includes a small ceramic filter pressure tank in addition to the separate filter tank. The main tank is about 1.5 meters wide and about 2.5 meters tall and it holds about 3000 liters of water. The smaller internal filter tank is about 50 cm wide and about 70 cm deep, and while the general dimensions can vary quite a bit, it should hold about 300 liters of water. The ceramic filter pressure tank is about 50 cm wide and about 40 cm deep. While any number of materials could be used to make the tanks, including fiberglass, metal, plastic, or cement (or combination thereof), stainless steel seems to be the best material for its strength, durability, and characteristic of not imparting any of its material into the water. The general design of this storage tank features either a circular or elliptical shape with an angled top, which allows an enclosed secure space for filters, pumps, and accessories in the top section of the tank. The top section can be locked and protected from environmental factors, and allows pumps, filters and pipes to be fully integrated. FIG. 4B shows a top view of the tank with different components within it.

The source water 11002 enters the storage tank by first passing through a series of filters which might include carbon filter 11009.2 (to reduce organic contaminants and dissolved substances), resin filter 11009.4 (heavy metals and minerals), or manganese filter 11009.3 (to reduce minerals) to the system. Filter options are selected by the nature of the source water. Well water, city water, and surface water from lakes and streams have different characteristics and require different treatment methods. The source water contemplated here in FIG. 4A assumes that it has already been treated to some extent already, as for example, municipal water. If the source water for this water storage tank was from a well with heavy iron and manganese deposits, the order of water treatment and methods used would vary substantially. In that case, perhaps the ozone in the smaller filter tank would treat the water first before it was sent to the main tank and then past the carbon, resin, and manganese filters before being used or finally through the ceramic filter if used for drinking water. On the other hand, for lakes and rivers full of mud and debris, a system of roughing filters and slow sand filters or other sediment removing filters and tanks may need to be used first before water even enters the smaller internal filter tank or main storage tank. If the system as described herein were contemplated for use with a commercial drinking water bottle factory, additional filters or additional ozone after the water left the storage tank might be used before the water was put into drinking water bottles.

At the heart of this system is a small internal filter tank 11003. This small tank houses a small pleated filter 11003.6. Taking city treated water as an example, the source water enters the small internal filter tank at 11003.1 after the water has passed the filter modules (carbon, resin, etc.) in the storage compartment above. The small filter tank has a drain line 11003.2 to allow easy cleaning of the filter and filter tank when necessary, a couple of on-off valves 11003.3, and a high water sensor 11003.4. The filter tank will have a working water level 11003.5 (when the ozone generator is operating) which will be higher than the water level 11005 in the main storage tank. The water level for the main tank is controlled by a water level sensor 11004 which turns on the source water pump (not shown in this drawing) as water is consumed in the main tank.

The small internal filter tank (hereinafter simply called the "Sifil tank") is connected to a lift tube 11006 which draws water from the main tank and lifts that water into the Sifil tank by the action of rising ozone and air bubbles from a diffuser 11006.1 which releases ozone and treated air generated by an ozone generator 11006.2 and connected to the diffuser by an ozone tube 11006.3 which is placed inside the outside utility box 11014 and directed over to the Sifil tank 11003 and down the lift tube 11006 until it reaches the diffuser. The lift tube and position of the diffuser are placed about 10 inches from the bottom of the stainless steel storage tank. The higher water level in the Sifil tank 11003.5 compared to the main tank 11005 provides the water flow through the filter and back down into the main tank and this circular flow creates clean filtered water 11007. Water entering 11003.1 the Sifil tank 11003 has a chance to mix with the ozone and air first before the water enters the main tank. The concentration of ozone and treated air compared to the small volume of water in the Sifil tank is much higher than the concentration in the main tank where the ozone is highly diluted. This concentrated level of ozone and treated air in the Sifil tank provides an opportunity to improve the oxidizing potential and time that the incoming water is exposed to the ozone and air (called "contact time") and also allows the incoming water to be filtered before it empties into the main tank. This is a major improvement over existing ozone aeration systems. The water level sensor switch 11004 is located in the main tank to give a more accurate reading of the water available in the main tank, as a dirty clogged filter would increase the level in the Sifil tank 11003 (water can not flow back to the main tank easily) and reduce the water level and useable water in the main tank.

The pleated filter 11003.6 is accessible by a Filter Tank Access Lid 11001.1 which is about 40 cm wide. The Sifil tank has a drain that allows all the water to be drained 11003.2 (after shutting the two on-off valves 11003.3 and the valve controlling the Filtered Water 11007) and also allows the pleated filter 11003.6 to be cleaned by spraying water on it and letting the debris collected in the filter empty out the drain. The Sifil tank also has a "high water level sensor" 11003.4 which simply allows water to flow out of a pipe at the top of the Sifil tank if the water level reaches a designated high point in the tank. This is an indication that the filter 11003.6 itself is clogged with iron or other impurities which is restricting the flow past the filter and preventing the water that is being lifted in the lift tube from the main tank to pass the filter and flow back to the main tank. This is a major improvement over existing aeration/ozone storage tank systems as previous designs give no such indication that the fluid filter is clogged. The Sifil filter tank could also be fitted with an electronic sensor that indicates that the water level is too low, indicating that the ozone generator or the ozone diffuser is not operating properly and not lifting the water into the Sifil filter tank to normal levels or indicating that the source water, for whatever reason, has not been refilled, either because the source water pump has failed, the water supply is not available, or some pipe has broken or electrical system has failed.

The main storage tank features an integrated set of ceramic filters 11008, shown in FIG. 11C. Water in the main tank 11001 is drawn by the water pump 11009 at an intake point 11009.1 about 20 inches from the bottom of the main tank, where the water is either pumped to the house as household water 11010 (showers, laundry, etc.) or pumped to the house as drinking water 11010.1 via the set of ceramic filters 11008 in the ceramic filter pressure tank 11008.1. Two separate water lines to the house are used. Normally, ceramic filters are added as a separate component with their own stainless steel housing. The set of ceramic filters shown here uses a separate tank inside the main tank as its housing. Ceramic filters are widely used for drinking water as the last step to remove bacteria, protozoa, and other contaminants. The ceramic filters can be installed, maintained, and replaced easily, as more specifically described below, by opening the pressure tank 11008.1 and lifting the ceramic filter set 11008 by disconnecting the lines (with a "union" connector or similar device) through the Ceramic Filter Access Lid 11001.2. The access hole also provides a convenient place to enter into the main tank and go down inside, if this becomes necessary for cleaning or repairs. In that case, the ceramic pressure tank is removed entirely to gain access below.

The top of this water storage tank, as shown in FIGS. 3B and 4B, features a service door 11011 that can be locked to store tools and other items necessary for taking care of a water tank. Included inside the storage compartment are multimedia filters 11009.2 to 11009.4 and a water pump 11009 and a utility box 11013. Internal conduits for electrical lines 11012 and combination electrical and utility lines (such as an ozone tube) are also shown here. Though in FIG. 4A, ozone generator 11006.2 is seen within the tank, in reality, the ozone generator 11006.2 would be attached to the outside of the tank and the ozone line 11006.3 would be threaded into the utility box 11014 and over to the lift tube 11006 and attached to the diffuser 11006.1. A shade for the ozone machine to protect it from the heat of the sun and bad weather would be needed also.

FIGS. 3A-C show another configuration of the divided tank filter system where the ceramic filters are suspended in the main water storage tank.

Various Filter Designs

Figure 8C:
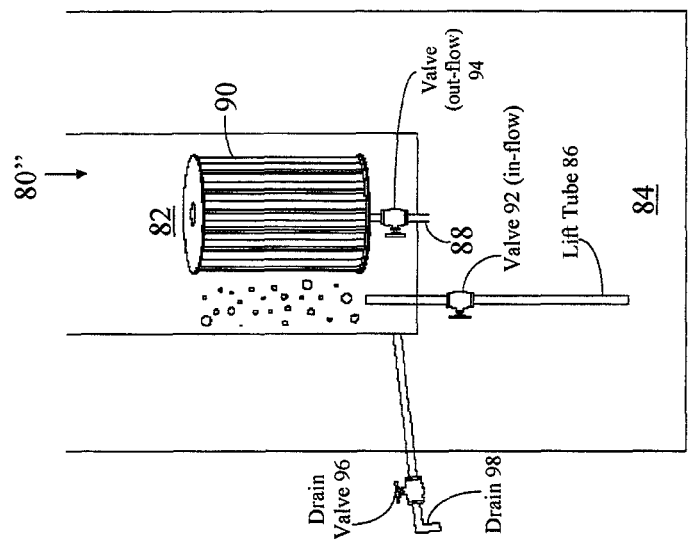

The present invention works with various filter configurations. The configurations 80, 80' and 80" shown in FIGS. 8A-C each use a lift tube 86, but use an auxiliary water tank 82 separate from the main reservoir 84 (common features in each figure are given the same number for convenience). Water is drawn from the main reservoir 84 by the action of the rising bubbles of ozone and air emanating from the lift tube 86 and the water in the auxiliary water tank 82 flows back to the main reservoir via a conduit 88 because the water pressure is higher (due the higher water level) in the auxiliary water tank 82. Moreover, while a lift tube is used, a mixer assembly is not needed. In prior art systems, such a mixer assembly would need to be activated when a water pump starts. The water pump and mixer would create a suction which draws ozone into (and mixes) with the incoming source well water. When the water pump turns off, presumably because the tank is full, the mixer would stop working. However, in the FIGS. 8A-C designs according to the present invention, the fluid is held in the smaller auxiliary tank 82 and mixes with the high concentration of ozone and air, until the water flows past the filter 90 and into the main tank 84. Another benefit of this separate divided tank design is the ability to wash the filter 90 without taking it out of the tank 82, by simply closing in-flow 92 and out-flow 94 valves of the filter tank and opening a small drain valve 96 and hosing down the filter and allowing the debris to flow out the drain conduit 98. Such in-flow and out-flow valves 92, 94 and drain valves 96 are shown explicitly in FIGS. 8A-C. Examples of such in-flow and out-flow valves and drain valves can also be found in FIGS. 3A, FIG. 4A, FIG. 1, and FIG. 2 (see, for example, in-flow valve 0002.2, outflow valve 005.2, and drain valve 004.1 in FIG. 2). This is a major improvement over existing water storage tanks especially where the source water is well water and is full of iron or manganese, which after a few weeks starts to "cake" on the filter, clogging it, until it is cleaned.

This would also be a major improvement for spas and pools as the debris that collected in the fluid filter housed in the side filter tank could be emptied and washed away without having the whole pool or spa contaminated again. It may be surprising to see all of the organic materials (pieces of hair, skin, dead algae and other organic material) that collect in the fluid filter according to the present invention that a traditional fluid pump and filter system do not filter out. The particles trapped in the inventive ozone aeration fluid filter are small and tend to be suspended in the water. These particles would otherwise provide nutrients for bacteria and algae and cause significant fluctuations to the pH of the fluid in the main fluid reservoir. According to the present invention, the collection of such particles on the inventive fluid filter provides an opportunity to create a bio-film that together with the low levels of ozone, reduce impurities and bacteria in the pool and spa, as previously discussed above.

Fluid-Based Exercise Machine with Ozonated Fluid

In one embodiment, the example pool/spa shown in FIG. 1 may be used as a type of fluid-based exercise machine for fat reducing, heart strengthening, muscle conditioning etc. The user of the exercise machine may run in place, twist and turn, or perform other free-style movements/aerobics inside the pool/spa/fluid reservoir while floating. A relatively smaller size personal pool/spa/fluid reservoir that is easy to install in a home or other facility can be useful as an exercise machine. Since cleaning up the fluid in the exercise machine is quite easy with ozone-aeration, and the fluid in the exercise machine can be kept almost free of fluid-treatment chemicals that are commonly used, these designs will be appealing to a lay person with little knowledge about fluid reservoir cleaning.

An example fluid-based exercise machine is about 190 cm deep. It is not a plunge pool or a pool where one can walk around and cool off. What distinguishes it from other pools and makes it an exercise apparatus is that it is small, about 9 by 12 feet and it is deep. Its main function is for exercise, much like a treadmill, StairMaster, etc. Further, it is chemical free and one can take care of it oneself about as easily as taking care of a treadmill. It is easy to maintain it if one uses the preferred ozone generator.

Adding reservoir-cleaning chemicals may negate whatever fluid treatment the ozone is providing. That's why the user is recommended not to use chemicals in the reservoir of the ozonated-fluid-based exercise machine.

This exercise machine is useful for indoor use, for example, for people who are forced to spend a lot of time indoors due to inclement weather, such as, snow, storm, rain etc. Traditionally used reservoir-cleaning chemicals, such as, chlorine and salt, often generate bad odors. In the ozonated fluid-based exercise machine, if the ozone is captured, it is possible to kill molds and control odors in the room itself, perhaps letting the ozone fill the room at night and then venting it in the morning before the users arrive.

Algorithm for Treating Fluid with Ozonated Air

To keep a body of fluid, such as water in a pool/spa/exercise machine clean using only ozonated air, and no chemical, it is required to use a certain ratio of ozone and clean air to the volume of fluid in the reservoir. For a typical small exercise pool of 24 cubic meters of water, it would require about 8 grams per day of ozone and about 10 cubic meters per day of clean air provided, both amounts based on continuous operation of the ozone generator 24 hours a day. Changes in the volume ("V") of the water to be treated and the ozone and air required can be expressed by the following formula:

Ozonated Air required for $V$ cubic meter of water=$[(V/24)\times 8]$ grams of ozone+$[(V/24)\times 10]$ cubic meters of air. One cubic meter is 1000 liters of water.

For example, a pool with 48 cubic meters of water would require 16 grams of ozone and 20 cubic meters of clean air per day. As the amount of ozone and air increases, the placement of the ozonated air and water circulation in the pool may require distribution to different points around the pool.

This algorithm is based on the following assumptions:
1) The ozonated air is connected to a diffuser that releases the ozonated air inside a lift tube which causes water from a pool or spa to be lifted inside the lift tube and causes a flow of water through a filtration device, either in an auxiliary tank or in the pool or spa itself, and the filtered water flows to the pool or spa;
2) The filtration device is similar in quality and construction to the Reemay pleated filter, or uses a filtration device that functions and traps impurities in a substantially a similar manner;
3) The recreational water is covered when not in use;
4) Sunlight is blocked when not in use;
5) The users practice proper hygiene;
6) No chemicals that would interfere with the treatment process are added to the water;
7) The algorithm is based on a water temperature of approximately 27 degrees centigrade. For each 10 degree rise in water temperature, or fraction thereof, add double (or respective fraction) the amount of ozone and air to the amount by using the algorithm above;
8) The source water is clean and chemical-free (after passing appropriate filters) and meets minimum drinking water standards; and,
9) The recreational water receives proper maintenance, including:
    a) The recreational water tank floor is vacuumed and cleaned as needed;
    b) The recreational water tank sides are brushed as needed; and,
    c) An independent conventional water pump and filtration system is used on a normal schedule given the volume of the water and the filtration system is backwashed regularly as needed.

Note that the amount of ozone and air for treating recreational water not maintained under the previously enumerated conditions would need additional consideration. Presumably, more ozone and air would be required, but the amount would probably require tests on a case by case basis. Also, for users who want the benefit of a more concentrated "ozone" bath for health purposes, they can increase the ozone and air as desired, for example as in a spa, where an ozone residual may be purposely maintained. An ozone capturing device may be periodically use to ventilate the excess ozone gas after the intended period of use.

The ozone systems described above can be used for a variety of other applications, including, but not limited to, food handling and manufacturing (preserving vegetables, fish, and making bread and ice), fish tanks and ponds to keep the fluid clean and add oxygen for the fish, and agricultural applications such as hydroponics, wine growing, or flower nurseries and wherever one wants to avoid unwanted pathogens and spores and prevent premature spoilage.

It should be understood that processes and techniques described herein are not inherently related to any particular apparatus and may be implemented by any suitable and similar functioning combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the server arts. It is intended that the specification and examples be considered as exemplary only, with a true scope and spirit of the invention being indicated by the following claims.

What is claimed is:

1. An apparatus for supplying ozone-aerated and filtered fluid to a main fluid reservoir, comprising:
    an auxiliary fluid reservoir for filtering and ozone-aerating fluid therein positioned adjacent to and outside of the main fluid reservoir;
    a first conduit for enabling ozone-aerated and filtered fluid in the auxiliary reservoir to flow into the main reservoir by gravity when the fluid level in the auxiliary fluid reservoir is higher than the fluid level in the main fluid reservoir;
    a second fluid conduit for enabling fluid to flow from the main fluid reservoir to the auxiliary fluid reservoir;
    a filtration device comprising filtering surfaces housed within the auxiliary fluid reservoir, wherein fluid in the auxiliary fluid reservoir is enabled to pass through the filtering surfaces before entering said first conduit;
    a lift tube having an upper end and a lower end, said lift tube upper end open within the auxiliary fluid reservoir, said lift tube extending below the auxiliary fluid reservoir a predetermined length and having its lower end connected to the end of said second fluid conduit opposite to the end of said second fluid conduit connected to the main fluid reservoir, such that fluid from the main fluid reservoir is fed by gravity into said lift tube and up into said auxiliary fluid reservoir via said second fluid conduit; and
    a diffuser positioned inside said lift tube lower end for injecting ozonated air into the fluid in the lift tube; and
    such that, when ozonated air is injected into said lift tube by the diffuser, the expansion of the ozonated air as it bubbles up said lift tube causes the fluid in said lift tube to flow up the lift tube and into the auxiliary fluid reservoir, said fluid in contact in said lift tube with the ozonated air being injected by the diffuser, to cause the level of fluid in the auxiliary fluid reservoir to be higher than the level of fluid in the main fluid reservoir and thereby to cause ozone-aerated fluid to flow through the filtration device and into the first fluid conduit from the auxiliary fluid reservoir and into the main fluid reservoir, at the same time causing fluid to be drawn through said second fluid conduit from the main fluid reservoir and into said lift tube.

2. The apparatus of claim 1, further comprising a third conduit for enabling fluid from an external source to be fed to the auxiliary fluid reservoir.

3. The apparatus of claim 1, further comprising a third conduit for coupling ozonated air from an ozone generator to the diffuser.

4. The apparatus of claim 1, wherein said lift tube is at least ten feet long and has a diameter of between about one and one half inches and two inches.

5. The apparatus of claim 1, wherein the second conduit has a slope of at least 5 degrees down from the main fluid reservoir to the lower end of the lift tube, and wherein the first conduit has a slope of at least 5 degrees down in the direction from the auxiliary fluid reservoir to the main fluid reservoir.

6. The apparatus of claim 1, further comprising an ozone-capturing device positioned above the auxiliary fluid reservoir for capturing undissolved excess ozone gas.

7. The apparatus of claim 1, wherein the auxiliary fluid reservoir has a bottom and wherein said first conduit is connected to the bottom of said auxiliary fluid reservoir.

8. The apparatus of claim 1, wherein filtering surfaces of the filtration device supports a filtering layer of bio-film comprising organic material.

9. The apparatus of claim 1, wherein ozone in the ozonated air removes impurities from the fluid without requiring additional chemicals.

10. The apparatus of claim 1, wherein the fluid is water and the volume of water to be treated is V, the amount of ozonated air coupled to said diffuser equals [(V/24×8] grams of ozone plus [(V/24)×10] cubic meters of clean air at a water temperature of about 27° C.

11. The apparatus of claim 10, wherein for each 10° C. or a fraction thereof rise in water temperature above 27° C., each of the amount of ozone and volume of clean air is doubled or proportionally increased, respectively, to ozone-aerate the same volume of water.

12. The apparatus of claim 1, wherein the apparatus further comprises:
    an out-flow valve to control the flow of ozone-aerated fluid from the auxiliary fluid reservoir to the main fluid reservoir;
    an in-flow valve to control the flow of fluid from the main fluid reservoir to the auxiliary fluid reservoir; and
    a drainage valve coupled to the lower portion of the auxiliary fluid reservoir enabling drainage of the fluid in the auxiliary fluid reservoir when the drainage valve is open, such that, when the in-flow valve and the out-flow valves are closed, the filter and the auxiliary reservoir can be cleaned without contaminating the fluid in the main fluid reservoir.

* * * * *